(12) United States Patent
Toyama et al.

(10) Patent No.: US 9,616,825 B2
(45) Date of Patent: *Apr. 11, 2017

(54) WIRE HARNESS

(71) Applicant: YAZAKI CORPORATION, Tokyo (JP)

(72) Inventors: Eiichi Toyama, Kosai (JP); Shigemi Hashizawa, Kosai (JP)

(73) Assignee: YAZAKI CORPORATION, Tokyo (JP)

( * ) Notice: Subject to any disclaimer, the term of this patent is extended or adjusted under 35 U.S.C. 154(b) by 21 days.

This patent is subject to a terminal disclaimer.

(21) Appl. No.: 14/160,718

(22) Filed: Jan. 22, 2014

(65) Prior Publication Data

US 2014/0131095 A1 May 15, 2014

Related U.S. Application Data

(63) Continuation of application No. PCT/JP2012/068497, filed on Jul. 20, 2012.

(30) Foreign Application Priority Data

Jul. 21, 2011 (JP) .................................. 2011-159514

(51) Int. Cl.
*H01B 7/00* (2006.01)
*B60R 16/02* (2006.01)

(52) U.S. Cl.
CPC ...... *B60R 16/0215* (2013.01); *B60R 16/0207* (2013.01)

(58) Field of Classification Search
CPC ........... B60L 11/1803; B60L 2270/147; B60R 16/0215; B60R 16/0207; F16C 1/26; F16C 2240/46; H01B 5/102; H01B 7/00; H01B 7/16; H01B 7/0018; H01B 7/1895; H01B 9/02; Y02T 10/7005; Y10T 74/20456

USPC ............ 174/72 A, 108, 128.2, 110 R, 120 R, 174/113 R

See application file for complete search history.

(56) References Cited

U.S. PATENT DOCUMENTS 2,136,258 A * 11/1938 Vrooman ......................... 174/43
4,458,967 A *  7/1984 King .................... H01R 23/662
                                                         439/427
5,349,133 A *  9/1994 Rogers ............................ 174/36
(Continued)

FOREIGN PATENT DOCUMENTS

CN        2618268 Y       5/2004
CN     201364771 Y      12/2009
(Continued)

OTHER PUBLICATIONS

Cable_harness wikipedia, Dec. 2009.*
(Continued)

*Primary Examiner* — Timothy Thompson
*Assistant Examiner* — Guillermo Egoavil
(74) *Attorney, Agent, or Firm* — Sughrue Mion, PLLC

(57) ABSTRACT

A wire harness includes one or more conductive paths, and a conductive path protection member that covers the conductive path. The conductive path protection member is formed into a cylindrical shape by spirally winding a metal wire material and portions of the metal wire material positioned to be adjacent to each other contact with each other at side end faces opposed to each other.

5 Claims, 2 Drawing Sheets

(56) References Cited

U.S. PATENT DOCUMENTS

| | | | | |
|---|---|---|---|---|
| 5,516,986 | A | * | 5/1996 | Peterson .............. H01B 7/0009 174/108 |
| 7,956,289 | B2 | * | 6/2011 | Morimoto ................. F16C 1/26 174/108 |
| 2003/0044136 | A1 | | 3/2003 | Nakamura et al. |
| 2005/0011687 | A1 | | 1/2005 | Yamaguchi et al. |
| 2006/0278423 | A1 | | 12/2006 | Ichikawa et al. |
| 2008/0289849 | A1 | * | 11/2008 | Varkey ................... H01B 7/046 174/102 R |
| 2009/0107694 | A1 | * | 4/2009 | Watanabe ................ H01B 7/16 174/102 R |
| 2010/0170697 | A1 | * | 7/2010 | Chang .................... H01B 5/102 174/128.2 |
| 2011/0133141 | A1 | * | 6/2011 | Carlson et al. ........ 254/134.3 R |

FOREIGN PATENT DOCUMENTS

| | | |
|---|---|---|
| DE | 19523639 A1 | 1/1996 |
| DE | 10343040 A1 | 5/2005 |
| DE | 202009009151 U1 | 1/2011 |
| JP | 833445 A | 2/1996 |
| JP | 11329096 A | 11/1999 |
| JP | 2002-75076 A | 3/2002 |
| JP | 2004224156 A | 8/2004 |
| JP | 2005235409 A | 9/2005 |
| JP | 2006314167 A | 11/2006 |
| JP | 2008-164100 A | 7/2008 |
| JP | 2010-282773 A | 12/2010 |
| WO | 01/51977 A2 | 7/2001 |
| WO | 0151977 A2 | 7/2001 |
| WO | WO 2012091171 A1 * | 7/2012 |

OTHER PUBLICATIONS

English-Language Translation of Written Opinion (PCT/ISA/237) dated Sep. 18, 2012 issued by the International Searching Authority in corresponding Application No. PCT/JP2012/068497.
Communication dated Feb. 25, 2015 issued by European Application in counterpart European Application No. 12815509.0.
International Search Report dated Sep. 18, 2012 from the International Searching Authority in counterpart application No. PCT/JP2012/068497.
Written Opinion dated Sep. 18, 2012 from the International Searching Authority in counterpart application No. PCT/JP2012/068497.
Communication issued on Sep. 8, 2015 by the Japanese Patent Office in related Application No. 2011-159514.
Communication dated Nov. 17, 2015 issued by the State Intellectual Property Office of the People's Republic of China in counterpart Chinese Patent Application No. 201280036209.2.
Communication dated May 14, 2015 issued by the State Intellectual Property Office of the People's Republic of China in counterpart Chinese Patent Application No. 201280036209.2.
Communication issued Apr. 5, 2016, issued by the Japanese Patent Office in counterpart Japanese Patent Application No. 2011-159514.
Office Action dated Oct. 27, issued by the State Intellectual Property Office of the People's Republic of China in counterpart Chinese Patent Application No. 201280036209.2.
Office Action issued on Jun. 2, 2016, issued by the State Intellectual Property Office of P.R. China in counterpart Chinese Application No. 201280036209.2.
Office Action dated Mar. 10, 2016 issued by the State Intellectual Property Office of the People's Republic of China in counterpart Chinese Patent Application No. 201280036209.2.

* cited by examiner

WIRE HARNESS

CROSS-REFERENCE TO RELATED APPLICATION

This application is a continuation of PCT application No. PCT/JP2012/068497, which was filed on Jul. 20, 2012, based on Japanese Patent Application No. 2011-159514 filed on Jul. 21, 2011, the contents of which are incorporated herein by reference.

BACKGROUND OF THE INVENTION

1. Technical Field

The present invention relates to a wire harness.

2. Background Art

A wire harness disclosed in the following JP-A-2004-224156 includes three high-voltage electrical power lines and three metallic protection pipes for accommodating and protecting each of these three high-voltage electrical power lines. The high-voltage electrical power line is provided for connecting a motor mounted on a front side of a vehicle and an inverter mounted on an intermediate or rear side of the vehicle.

The wire harness is adapted to be routed through a vehicle body under floor that is the outside of a vehicle body frame. Therefore, the metallic protection pipe is formed so as to be able to protect the high-voltage electrical power line from stone splash or water splash. The metallic protection pipe has rigidity to protect the high-voltage electrical power line from stone splash or water splash and to prevent deflection of the high-voltage electrical power line. In addition, the metallic protection pipe has an electromagnetic shielding function because of being made of metal.

The wire harness is manufactured by inserting a high-voltage electrical power line through a straight metallic protection pipe, performing this inserting operation for three metallic protection pipes and then bending the metallic protection pipes along a routing path of the wire harness in a vehicle body under floor. After being manufactured as described above in a factory of a harness manufacturer, the wire harness is transported to an assembly factory of a vehicle manufacturer and mounted on a predetermined position of a vehicle, so that routing is adapted to be completed.

SUMMARY OF INVENTION

Since the metallic protection pipe is used in the above prior art, it is possible to favorably protect the high-voltage electrical power line from an external force. However, the wire harness of the prior art has the following problems, due to using the metallic protection pipe.

Specifically, there is a problem that it is required to secure a sufficient space for each metallic protection pipe and each wire harness, in order to prevent the metallic protection pipes from being brought into contact with each other or being deformed during transportation of the wire harness. Further, since the metallic protection pipe is bent in a three-dimensional manner, there is a problem that it is required to secure a three-dimensional space.

The present invention has been made in view of the above circumstances and an object thereof is to provide a wire harness that has a protective function against an external force and is capable of achieving space saving during transportation.

In order to solve the above-described problems, a wire harness of the present invention includes one or more conductive paths and a conductive path protection member configured to cover the conductive path. The conductive path protection member is formed into a cylindrical shape by spirally winding a metal wire material and portions of the metal wire material positioned to be adjacent to each other are configured in such a way that side end faces opposed to each other come into contact with each other.

The wire harness of the present invention having such characteristics includes a metallic conductive path protection member that is formed by spirally winding a metal wire material and a conductive path that is protected by being covered with the conductive path protection member. Further, because of being formed by spirally winding the metal wire material, the conductive path protection member has flexibility.

The conductive path protection member may be formed by spirally winding the metal wire material to match the diameter of the conductive path. In such a formation, a versatile conductive path protection member can be employed. Further, since the metal wire material is made of metal, the conductive path protection member has a protective function against an external force, of course, and it is possible to absorb the heat generated in the conductive path and to disperse the heat over the entire conductive path protection member or it is possible to prevent the heat from the outside from being transmitted to the conductive path. In addition, since the conductive path protection member has flexibility, it is easy to form a desired bent shape (for example, a bent shape that can be easily transported). Further, since the conductive path protection member has flexibility, a large-scale device such as a pipe bender is not required.

Further, in the wire harness of the present invention, the metal wire material includes a first metal wire material and a second metal wire material, which have a cross-section shape different from each other. The conductive path protection member is formed by spirally winding the first metal wire material and the second metal wire material and portions of the first metal wire material and the second metal wire material positioned to be adjacent to each other, alternately, are configured in such a way that side end faces opposed to each other come into contact with each other.

The wire harness of the present invention having such characteristics includes a conductive path protection member that is formed by spirally winding the first metal wire material and the second metal wire material, which have a cross-section shape different from each other and a conductive path that is protected by being covered with the conductive path protection member. Since the first metal wire material and the second metal wire material, constituting the conductive path protection member, have a cross-section shape different from each other, it is possible to generate a difference in the bent shape of the conductive path protection member at the time of bending the conductive path protection member. With the difference in the bent shape, a gap hardly occurs between the side end faces of the first metal wire material and the second metal wire material, which are opposed to each other.

Further, in the wire harness of the present invention, an edge processing component is provided in a terminal of the conductive path protection member.

The wire harness of the present invention having such characteristics includes a conductive path protection member which is provided at the terminal thereof with the edge processing component and a conductive path that is protected by being covered with the conductive path protection member. Since the conductive path protection member is provided at the terminal thereof with the edge processing component, the conductive path protection member can prevent damage or the like of the conductive path.

Further, in the wire harness of the present invention, the conductive path includes a conductor and a shielding member configured to cover the conductor.

The wire harness of the present invention having such characteristics includes a conductive path protection member that is a non-shielding member and, for example, a shielded electrical power line (conductive path) that is protected by being covered with the conductive path protection member. As described above, the conductive path protection member itself is a non-shielding member. The reason is that a shielding member is included in the conductive path side. When the conductive path protection member is configured as a non-shielding member, it is possible to simplify the structure of the conductive path protection member.

Further, the wire harness of the present invention further includes a covering member configured to cover the conductive path protection member. The covering member has a predetermined color.

The wire harness of the present invention having such characteristics includes a metallic conductive path protection member that is formed by spirally winding a metal wire material, a conductive path that is protected by being covered with the conductive path protection member and a covering member covering the conductive path protection member. The covering member itself has a predetermined color in a case where the conductive path is a high-voltage conductive path, for example. In this way, the covering member is able to cause the high voltage to be recognized in an easy and inexpensive manner (it is possible to recognize that the conductive path has a high voltage in an easy and inexpensive manner, as compared to a case where the conductive path protection member is painted by a predetermined color).

According to the wire harness of the present invention, a metallic conductive path protection member formed by spirally winding a metal wire material is used and flexibility is imparted to the conductive path protection member. Accordingly, there is an effect that the wire harness has a protective function against an external force and it is possible to achieve space saving during transportation.

Further, according to the wire harness of the present invention, a gap hardly occurs in the bent portion even when bending the conductive path protection member that is formed by spirally winding the metal wire material. As a result, there is an effect that better conductive path protection member can be configured.

Further, according to the wire harness of the present invention, there is an effect that it is possible to prevent damage or the like in a terminal position of the conductive path protection member.

Further, according to the wire harness of the present invention, there is an effect that it is possible to achieve cost reduction by simplifying the structure of the conductive path protection member.

Further, according to the wire harness of the present invention, the covering member is included and has a predetermined color. Accordingly, there is an effect that it is possible to recognize that the conductive path has a high voltage, for example, in an easy and inexpensive manner.

BRIEF DESCRIPTION OF DRAWINGS

FIG. 1A is a schematic view showing a routed state of the wire harness, FIG. 1B is a configuration view of the wire harness and FIG. 1C is a view showing the side and terminal of a conductive path protection member (First Embodiment).

FIG. 2A is a schematic view showing a routed state of the wire harness and FIG. 2B is a configuration view of the wire harness (Second Embodiment).

DESCRIPTION OF EMBODIMENTS

A wire harness includes a metallic conductive path protection member that is formed by spirally winding a metal wire material and a conductive path that is protected by being covered with the conductive path protection member. The conductive path protection member is adapted to have flexibility by being formed as described above.

[First Embodiment]

Figure 1A:
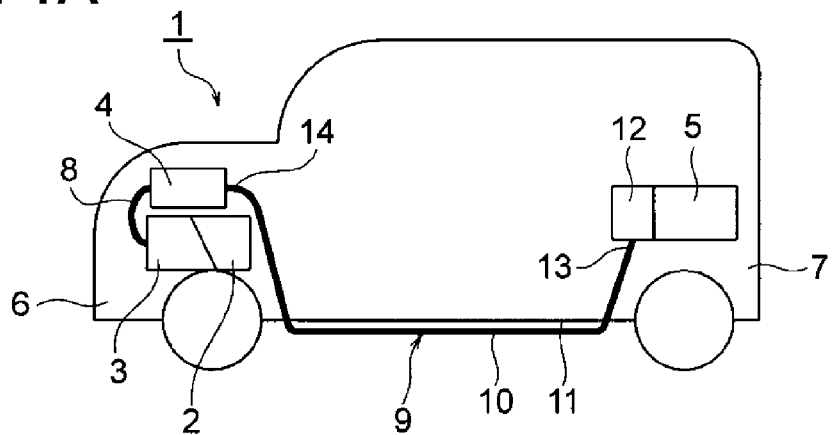
FIG. 1A to FIG. 1C are views showing a wire harness of the present invention.
Figure 1B:
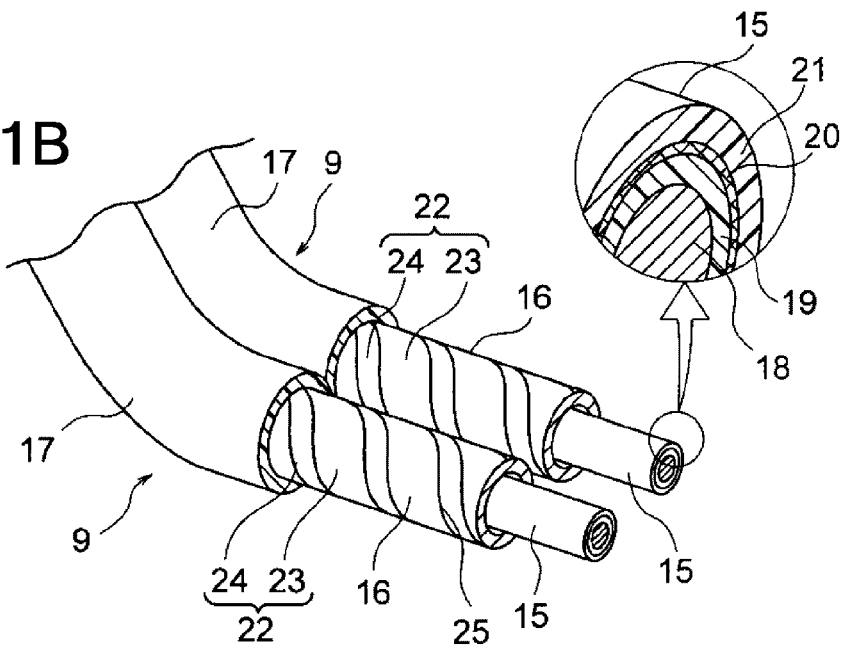
Figure 1C:
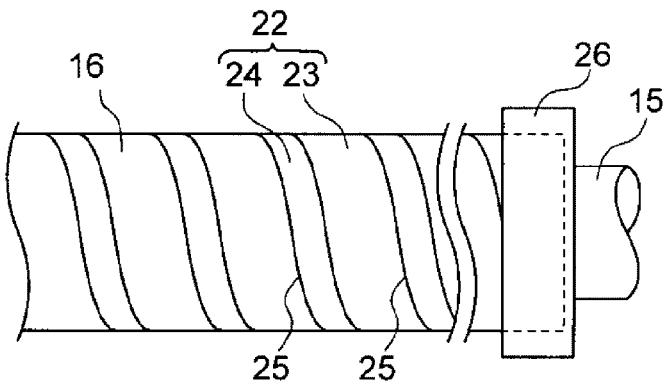

Hereinafter, a wire harness according to a first embodiment of the present invention will be described in detail with reference to the drawings. FIG. 1A to FIG. 1C are views showing a wire harness of the present invention. Specifically, FIG. 1A is a schematic view showing a routed state of the wire harness, FIG. 1B is a configuration view of the wire harness and FIG. 1C is a view showing the side and terminal of a conductive path protection member.

In the present embodiment, an example where the wire harness of the present invention is employed in a hybrid vehicle (it is noted that an electric vehicle or a general vehicle may be used) is illustratively described.

In FIG. 1A, reference numeral 1 indicates a hybrid vehicle. The hybrid vehicle 1 refers to a vehicle that is driven by mixing two power sources of an engine 2 and a motor unit 3. Electric power from a battery 5 (battery pack) is adapted to be supplied to the motor unit 3 via an inverter unit 4. In the present embodiment, the engine 2, the motor unit 3 and the inverter unit 4 are mounted in an engine room 6 at which front wheels or the like are located. Further, the battery 5 is mounted in a vehicle rear part 7 at which rear wheels or the like are located. Further, the battery 5 may be mounted in a vehicle cabin that is present in the rear of the engine room 6.

Although the motor unit 3 and the inverter unit 4 are connected to each other by a known high-voltage wire harness 8, a high-voltage wire harness 9 according to the present invention may be used. Further, the battery 5 and the inverter unit 4 are connected to each other by the high-voltage wire harness 9 according to the present invention. The wire harness 9 is used as a high-voltage wire harness. An intermediate part 10 of the wire harness 9 is routed on a ground side of a vehicle body under floor 11. Further, the intermediate part 10 is routed along the vehicle body under floor 11. The vehicle body under floor 11 is a known body and also referred to as a so-called panel member. The vehicle body under floor 11 is provided at a predetermined position thereof with a through-hole (reference numeral is not shown). The wire harness 9 is inserted through the through-hole.

The wire harness 9 and the battery 5 are connected to each other via a junction block 12 which is provided in the battery 5. A rear end 13 of the wire harness 9 is connected to the junction block 12 via a connector. The rear end 13 side of the wire harness 9 is routed on a floor in the side of the vehicle cabin. A front end 14 side of the wire harness 9 is also routed on the floor. The front end 14 side of the wire harness 9 is connected to the inverter unit 4 via a connector.

Now, a supplementary explanation of the present embodiment is given. The motor unit 3 is configured to include a motor and a generator. Electric power is supplied to the motor of the motor unit 3 from the junction block 12 provided in the battery (battery pack) 5 on the rear side of a vehicle through the wire harness 9 according to the present invention and via the inverter unit 4 on the front side of the vehicle. Further, the inverter unit 4 is configured to include an inverter that converts direct current into alternating current and a converter that converts alternating current into direct current. The motor unit 3 is formed as a motor assembly including a shield case. Further, the inverter unit 4 is formed as an inverter assembly including a shield case. The battery 5 is a Ni—MH based or Li-ion based battery and configured as a module. In addition, an electrical storage device such as a capacitor, for example, may be used. The battery 5 is not particularly limited, as long as the battery can be used in the hybrid vehicle 1 or an electric vehicle.

Next, a configuration and structure of the wire harness 9 will be described.

The wire harness 9 includes a high-voltage shielded electrical power line 15, a conductive path protection member 16 serving as both an exterior member and a protection member of the high-voltage shielded electrical power line 15 and a covering member 17 covering the conductive path protection member 16. In the present embodiment, two wire harnesses 9 having such a configuration are routed side by side. Here, an embodiment in which two wire harnesses 9 are routed side by side is merely illustrative and the number of the wire harness 9 may be one or three or more.

The high-voltage shielded electrical power line 15 is a shielded electrical power line (cable) for high-voltage and corresponds to the conductive path. The high-voltage shielded electrical power line 15 includes a conductor 18, an insulator 19, a shielding member 20 and a sheath 21. The conductor 18, the insulator 19, the shielding member 20 and the sheath 21 are arranged in order from inside to outside. The high-voltage shielded electrical power line 15 has a length required for electrically connecting the motor unit 3 to the invert unit 4 or the battery 5 to the inverter unit 4.

The conductor 18 is produced using copper or copper alloy, aluminum or aluminum alloy. The conductor 18 may have a conductor structure consisting of wires stranded together or a rod-shaped conductor structure having a rectangular or circular cross-section. In the case of the rod-shaped conductor structure having a rectangular or circular cross-section, the conductor 18 has a conductor structure of a straight angle single core or a circular single core, for example.

The insulator 19 is formed by extruding an insulative resin material on the outside of the conductor 18. In the present embodiment, a known insulator is used as the insulator 19.

The shielding member 20 is a member for shielding electromagnetic wave and has a cylindrical shape that is formed by braids having a plurality of conductive metal foils or a plurality of ultrafine wires. The shielding member 20 is connected to a shield case or the like of the inverter unit 4 directly or via a shield connector (not shown), for example, provided in a terminal of the high-voltage shielded electrical power line 15.

The sheath 21 is formed by extruding an insulative resin material on the outside of the shielding member 20. Similar to the insulator 19, a known sheath is used as the sheath 21.

As described above, the conductive path protection member 16 serves as both an exterior member and a protection member for the high-voltage shielded electrical power line 15. The conductive path protection member 16 is formed so as to allow the high-voltage shielded electrical power line 15 to be inserted therethrough. Specifically, the conductive path protection member 16 of the present embodiment has a substantially cylindrical shape so as to allow the high-voltage shielded electrical power line 15 to be inserted through the entire length thereof.

The conductive path protection member 16 is formed by spirally winding the metal wire material 22. The conductive path protection member 16 has flexibility. In order to impart the flexibility to the conductive path protection member, there is employed a method for spirally winding the metal wire material 22 so that side end faces of the metal wire material 22 opposed to each other come into contact with each other.

The metal wire material 22 is formed in a linear or plate shape. The metal wire material 22 has an arbitrary thickness. The metal wire material 22 of the present embodiment includes a first metal wire material 23 and a second metal wire material 24. The first metal wire material 23 and the second metal wire material 24 are formed to have a cross-section shape different from each other. Specifically, the first metal wire material 23 is formed to have a width wider than that of the second metal wire material 24. The conductive path protection member 16 is formed by spirally winding the first metal wire material 23 and the second metal wire material 24, which have a cross-section shape different from each other, in an arrangement where the first metal wire material 23 and the second metal wire material 24 are located to be adjacent to each other, alternately. The conductive path protection member 16 formed in this way has flexibility because the first metal wire material 23 and the second metal wire material 24 exhibit a spring effect.

Here, reference numeral 25 indicates contact portions between the side end faces opposed to each other. The contact portion 25 is a portion where a contact state is formed by an elastic force of metal material, etc. In the contact portion, there is no sticking between the side end faces.

Material of the metal wire material 22 configured by the first metal wire material 23 and the second metal wire material 24 can include aluminum or aluminum alloy, for example. Further, copper or copper alloy, iron, etc., can be also used.

The conductive path protection member 16 is used as a non-shielding member. This is intended to impart an electromagnetic shielding function to the high-voltage shielded electrical power line 15. Here, the conductive path protection member 16 may be used as the shielding member by imparting an electromagnetic shielding function thereto.

The conductive path protection member 16 is provided at a terminal thereof with an edge processing component 26. The edge processing component 26 is provided as a member for preventing an edge (including a burr, etc.) from being brought into contact with the high-voltage shielded electrical power line 15, in a case where the edge occurs in the terminal of the conductive path protection member 16. The edge processing component 26 is formed in a substantially cap shape that can be fitted to the terminal, for example.

The shape of the edge processing component 26 can be properly designed. In a case where the shape is not specified, a protective component such as a protective tape, for example, may be provided in the high-voltage shielded electrical power line 15. As the protective tape, an acetate tape or polyester tape, etc., is preferred, for example. Of course, by winding the protective tape, it is possible to prevent the high-voltage shielded electrical power line 15 from being damaged by the edge.

The covering member 17 is a protective member covering the conductive path protection member 16 and formed by extruding an insulative resin material. Similar to the sheath 21 or the insulator 19, a known member is used as the covering member 17. Since the wire harness 9 is used as a high-voltage wire harness, in the present embodiment, the covering member 17 is colored orange, as a means for recognizing the high voltage. For example, the covering member 17 is colored in a defined color by mixing orange-colored master batch into the resin material.

The covering member 17 has bendability to allow the flexibility of the conductive path protection member 16 to be sufficiently exhibited. Further, the covering member 17 serves as a protective member and therefore has a good abrasion resistance, etc.

The covering member 17 is a component that is included in accordance with the usage pattern. In other words, the shape of the covering member 17 can be properly designed.

In addition to the member that is formed by extruding the resin material, a cylindrical shrinkable tube that is in close contact with an outer surface of the conductive path protection member 16 by shrinkage can be provided as an example of the covering member 17. As the shrinkable tube, a resin tube (heat shrinkable tube) that shrinks by heat is preferred. Then, there is an advantage that it is easy to impart an insulating property to the shrinkable tube or it is easy to color the shrinkable tube by an orange color.

As material of the shrinkable tube, vinyl chloride, PET, PBT, etc., can be included. Preferably, the shrinkable tube is made of the vinyl chloride that is thin, is hardly ignited and has good bending resistance.

Next, an operation of manufacturing the wire harness 9 with the above-described configuration and structure is described. Here, views relating to the manufacturing operation are omitted. The following description is merely illustrative.

The conductive path protection member 16 is formed by spirally winding the metal wire material 22 configured by the first metal wire material 23 and the second metal wire material 24. The covering member 17 is formed on the outside of the conductive path protection member 16 by extrusion. Then, the conductive path protection member 16 covered with the covering member 17 is cut so that a full length is a desired length. Then, the high-voltage shielded electrical power line 15 is inserted through an internal space of the conductive path protection member 16 and, for example, a shield connector is mounted on the terminal of the high-voltage shielded electrical power line 15. In this way, the manufacturing of the wire harness 9 is completed.

On the other hand, the metal wire material 22 may be spirally wound so as to cover the high-voltage shielded electrical power line 15 and then the conductive path protection member 16 may be formed.

The wire harness 9 manufactured as described above is rounded in a state where it is easy to transport, for example, and accommodated in a tote box (not shown) or the like. Then, the wire harness 9 is transported to an assembly factory of a vehicle manufacturer, for example. After being transported to the assembly factory, the wire harness is taken out from a tote box (not shown) and then fixedly mounted to the vehicle body under floor 11 or the like. Then, electric connection or the like is performed whereby the routing of the wire harness 9 is completed.

Although not particularly limited, a known protector or the like is used in maintaining the bent state of the wire harness 9. Further, mounting fixation of the wire harness to the vehicle body under floor 11 or the like is performed by using a known clamp or the like.

Although the routed position of the wire harness 9 is set in the vehicle body under floor 11 or the like in the present embodiment, the routed position is not limited to such a position.

The wire harness 9 of the present embodiment requires an electromagnetic shielding countermeasure. Therefore, as the conductive path that is covered with the conductive path protection member 16, the high-voltage shielded electrical power line 15 is employed. When the wire harness does not require an electromagnetic shielding countermeasure, a general cable is employed, instead of the high-voltage shielded electrical power line 15.

Hereinabove, as has been described with reference to FIG. 1, the wire harness 9 includes the metallic conductive path protection member 16 that is formed by spirally winding the metal wire material 22 having the first metal wire material 23 and the second metal wire material 24 and the high-voltage shielded electrical power line 15 that is protected by being covered with the conductive path protection member 16. Further, because of being formed by a method of spirally winding the metal wire material 22, the conductive path protection member 16 has sufficient flexibility.

The conductive path protection member 16 may be formed by spirally winding the metal wire material 22 to match the diameter of the high-voltage shielded electrical power line 15. In such a formation, it is possible to impart versatility to the conductive path protection member. Further, since the conductive path protection member 16 is made of metal, the conductive path protection member 16 has a protective function against an external force and it is possible to absorb the heat generated in the high-voltage shielded electrical power line 15 and to disperse the heat over the entire conductive path protection member 16 or it is possible to prevent the heat from the outside from being transmitted to the high-voltage shielded electrical power line 15.

Since the conductive path protection member 16 has flexibility as described above and therefore it is easy to form a desired bent shape, a large-scale device such as a pipe bender, for example, is not required.

Since the first metal wire material 23 and the second metal wire material 24, constituting the conductive path protection member 16, have a cross-section shape different from each other, it is possible to generate a difference in the bent shape of the conductive path protection member 16 at the time of bending the conductive path protection member 16. With the difference in the bent shape, a gap hardly occurs between the side end faces of the first metal wire material 23 and the second metal wire material 24, which are opposed to each other.

As can be seen from the above description, the wire harness 9 has a protective function against an external force, as in the prior art, and exhibits an effect of achieving space saving during transportation.

[Second Embodiment]

Figure 2A:
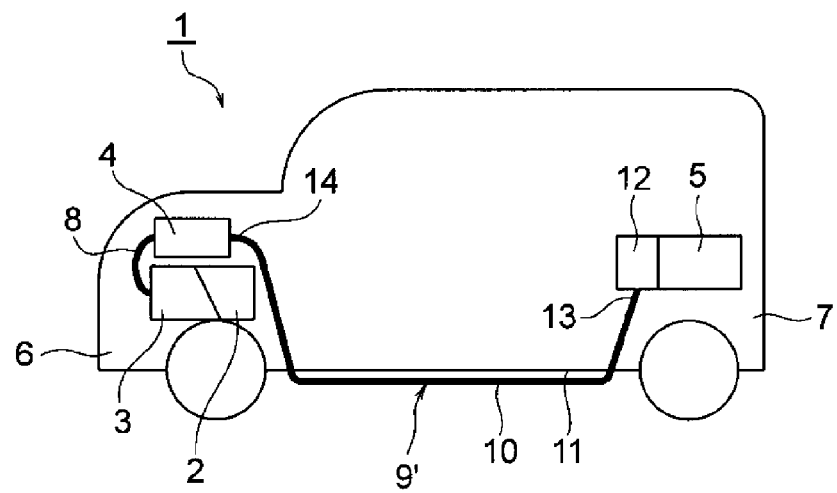
FIG. 2A and FIG. 2B are views showing a wire harness according to another example of the present invention.
Figure 2B:
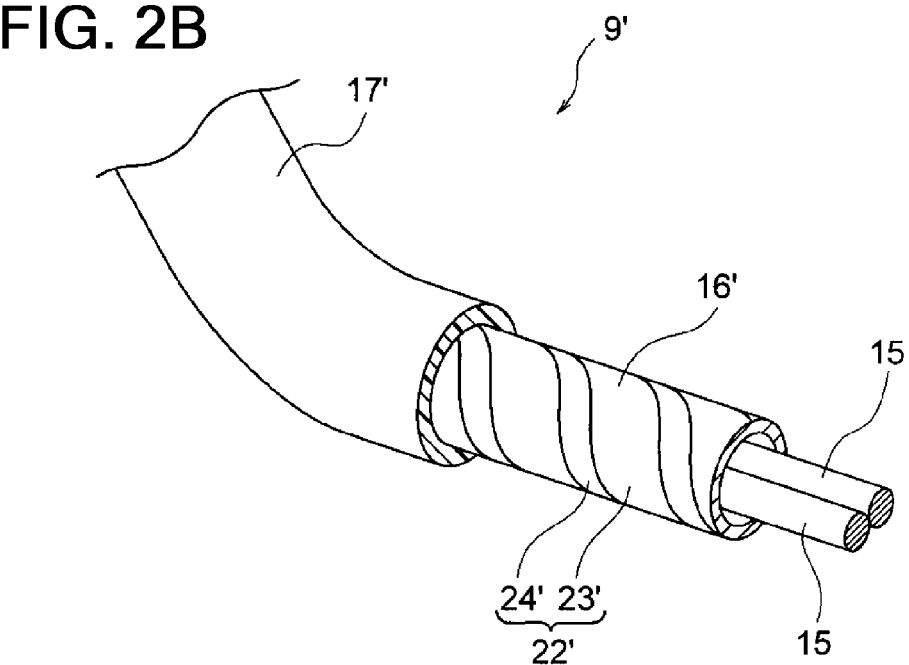

Hereinafter, a second embodiment is described with reference to the drawings. FIG. 2A and FIG. 2B are views showing a wire harness according to another example of the present invention. Specifically, FIG. 2A is a schematic view showing a routed state of the wire harness and FIG. 2B is a configuration view of the wire harness. Here, the same element will be denoted by the same reference numeral as that of the first embodiment and a duplicated explanation thereof will be omitted. Further, the similar element will be denoted by a reference numeral with dash.

In FIG. 2A, a wire harness 9' is routed in a vehicle in the same manner as in the first embodiment. The wire harness 9' includes two high-voltage shielded electrical power lines 15, a conductive path protection member 16' serving as both an exterior member and a protection member of the two high-voltage shielded electrical power lines 15 and a covering member 17' covering the conductive path protection member 16'. Unlike the wire harness 9 (see FIG. 1B) of the first embodiment, the wire harness 9' is routed by one. Since the wire harness 9' includes two high-voltage shielded electrical power lines 15 that are inserted through the conductive path protection member 16', the diameter of the conductive path protection member 16' and the covering member 17' is slightly thicker than that of the wire harness 9 of the first embodiment. An edge processing component (not shown) is provided in a terminal of the conductive path protection member 16'.

The conductive path protection member 16' is formed by spirally winding a metal wire material 22'. The metal wire material 22' includes a first metal wire material 23' and a second metal wire material 24'. The first metal wire material 23' and the second metal wire material 24' are formed to have a cross-section shape different from each other.

Of course, the wire harness 9' of the second embodiment has the same effects as the wire harness of the first embodiment.

Further, instead of two high-voltage shielded electrical power lines, a known cab tire cable may be used.

In addition, it is, of course, that the present invention can be variously modified and implemented in a range without changing the gist of the invention.

In the above explanation, the conductive path protection member 16 is formed by spirally winding the metal wire material 22 so that side end faces of the metal wire material 22 opposed to each other come into contact with each other. As other examples, the conductive path protection member may be a coil spring that is formed by spirally winding a metal wire material having a circular sectional shape or a coil spring that is formed by spirally winding a band plate-shaped metal wire material having a rectangular sectional shape.

Here, characteristics of the wire harness according to the above-described embodiments of the present invention are briefly summarized and listed in the following sections i to v, respectively.

[i] A wire harness includes one or more high-voltage shielded electrical power lines (15) and a conductive path protection member (16) that covers the high-voltage shielded electrical power lines (15). The conductive path protection member (16) is formed into a cylindrical shape by spirally winding a metal wire material (22) and portions of the metal wire material (22) positioned to be adjacent to each other contact with each other at side end faces opposed to each other.

[ii] In the wire harness described in above [i], the metal wire material (22) includes a first metal wire material (23) and a second metal wire material (24), which have a cross-section shape different from each other. The conductive path protection member (16) is formed by spirally winding the first metal wire material (23) and the second metal wire material (24) and portions of the first metal wire material (23) and the second metal wire material (24) positioned to be adjacent to each other, alternately, contact with each other at side end faces opposed to each other come into contact with each other.

[iii] In the wire harness described in above [i] or [ii], an edge processing component (26) is provided in a terminal of the conductive path protection member (16).

[iv] In the wire harness described in any one of above [i] to [iii], the high-voltage shielded electrical power lines (15) includes a conductor (18) and a shield member (20) that cover the conductor (18).

[v] In the wire harness described in any one of above [i] to [iv], the wire harness further includes a covering member (17) that covers the conductive path protection member (16). The covering member (17) has a predetermined color.

Although the present invention has been described in detail with reference to the particular embodiments, it is obvious to those skilled in the art that the particular embodiments can be variously modified and changed without departing a spirit and a scope of the present invention.

According to the wire harness of the present invention, since a metallic conductive path protection member formed by spirally winding a metal wire material is used and flexibility is imparted to the conductive path protection member, there are effects that the wire harness has a protective function against an external force and it is possible to achieve space saving during transportation.

REFERENCE NUMERALS LIST

1 . . . Hybrid Vehicle
2 . . . Engine
3 . . . Motor Unit
4 . . . Inverter Unit
5 . . . Battery
6 . . . Engine Room
7 . . . Vehicle Rear Part
8 . . . High-Voltage Wire Harness
9 . . . Wire Harness
10 . . . Intermediate Part
11 . . . Vehicle Body Under Floor
12 . . . Junction Block
13 . . . Rear End
14 . . . Front End
15 . . . High-Voltage Shielded Wire (Conductive Path)
16 . . . Conductive Path Protection Member
17 . . . Covering Member
18 . . . Conductor
19 . . . Insulator
20 . . . Shield Member
21 . . . Sheath
22 . . . Metal Wire Material
23 . . . First Metal Wire Material
24 . . . Second Metal Wire Material
25 . . . Contact Portion
26 . . . Edge Processing Component

What is claimed is:

1. A wire harness comprising:
one or more conductive paths: and
a conductive path protection member that covers the conductive path, wherein the conductive path protection member is formed into a cylindrical shape by spirally winding a metal wire material and portions of the metal wire material positioned to be adjacent to each other contact with each other at side end faces opposed to each other,
the side end faces opposed to each other comprise flat surfaces substantially parallel to each other,
the metal wire material includes a first metal wire material and a second metal wire material, which have a cross-section shape different from each other, and the conductive path protection member is formed by spirally winding the first metal wire material and the second metal wire material and portions of the first metal wire material and the second metal wire material positioned to be adjacent to each other, alternately, contact with each other at side end faces opposed to each other, the conductive path includes a conductor and a shield member that covers the conductor.

2. The wire harness according to claim 1, wherein an edge processing component is provided in a terminal of the conductive path protection member.

3. The wire harness according to claim 1, further comprising a covering member that covers the conductive path protection member, wherein the covering member has a predetermined color.

4. The wire harness according to claim 1, wherein the metal wire material comprises a band plate-shaped metal wire material having a rectangular sectional shape.

5. The wire harness according to claim 1, wherein the first metal wire material comprises a first band plate-shaped metal wire material having a rectangular sectional shape, and the second metal wire material comprises a second band plate-shaped metal wire material having a rectangular sectional shape, a cross sectional area of the first band plate-shaped metal wire material being different from a cross sectional area of the second band plate-shaped metal wire material.

* * * * *